Figure 1:
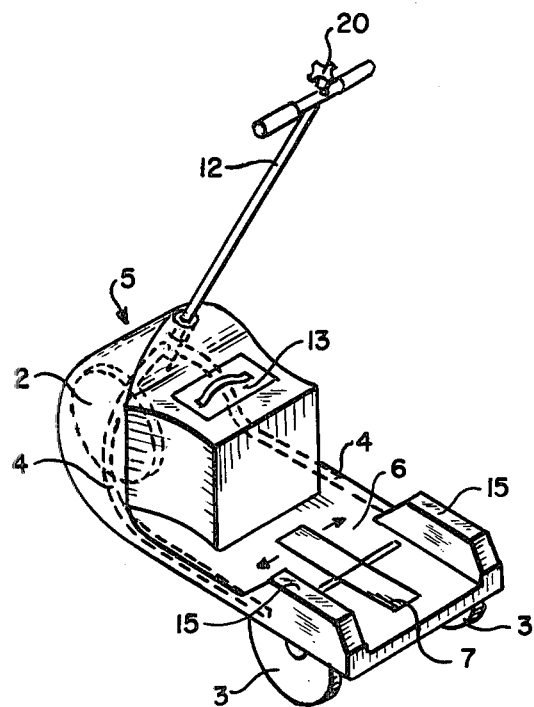

United States Patent [19]

Eichholz

[11] 4,354,569
[45] Oct. 19, 1982

[54] ELECTRIC VEHICLE

[76] Inventor: Heinz Eichholz, Kolpingstrasse, 4441 Schapen, Fed. Rep. of Germany

[21] Appl. No.: 135,843

[22] Filed: Mar. 31, 1980

[30] Foreign Application Priority Data

Apr. 14, 1979 [DE] Fed. Rep. of Germany ....... 2915387

[51] Int. Cl.³ ...................... B62D 61/08; B60K 26/02
[52] U.S. Cl. ................................... 180/211; 74/474;
   74/478; 74/561; 180/333; 180/334
[58] Field of Search ............... 180/315, 333, 334, 210,
   180/211, 213, 214; 74/478, 561, 474; 105/93

[56] References Cited

U.S. PATENT DOCUMENTS

| | | | |
|---|---|---|---|
| 2,483,224 | 9/1949 | Narcovich | 74/478 |
| 2,834,222 | 5/1958 | Hermanns | 74/561 |
| 3,117,648 | 1/1964 | Landreth | 180/65 R X |
| 3,289,780 | 12/1966 | Ferris | 180/65 R X |
| 3,369,629 | 2/1968 | Veiss | 180/216 |
| 3,506,080 | 4/1970 | Hott et al. | 180/65 R X |
| 4,151,892 | 5/1979 | Francken | 74/478 X |

Primary Examiner—Randolph A. Reese
Attorney, Agent, or Firm—Felfe & Lynch

[57] ABSTRACT

The present invention provides an electric vehicle, comprising a chassis having a pair of rear wheels and a steerable front wheel driven by an electric motor, a tread board disposed between the wheels for a standing user or driver, and a foot-operated speed control element, wherein control element is formed by a portion of the tread board (6) being designed as a rocking pedal (7) for controlling the electric motor by depression of the front portion of the pedal, and for actuating the brakes by depression of the rear pedal portion.

4 Claims, 2 Drawing Figures

ELECTRIC VEHICLE

The present invention relates to an electric vehicle, comprising a chassis having a pair of rear wheels and a steerable front wheel driven by an electric motor, a tread board disposed between the wheels for a standing user or driver, and a foot-operated speed control element.

Electric vehicles of this type are known and may be used, for instance by disabled person for their transportation. In an electric vehicle according to U.S. Pat. No. 3,506,080 the tread board is provided with a foot-operable knob for activating the battery and for speed control of the electric motor. Brake actuation is effected by means of a hand lever on the handle bar. In another vehicle on which the driver seats, however, brake actuation is effected by means of a foot pedal, while the driving control element is operated from the handle bar (U.S. Pat. No. 3,289,780). These conventional vehicles are somewhat difficult to handle. Since the control or operating elements are positioned on the handle bar, these vehicles are not adapted to be dismounted or collapsed readily. Thus, such vehicles can be transported in the trunk of an automotive vehicle with difficulty only. Their operation requires some degree of experience, and their use by unskilled persons, e.g. in airports or large exhibition halls, is therefore not possible. Furthermore, from U.S. Pat. No. 3,117,648, there is known an electric vehicle having a combination control element comprising a pair pedals for speed control and for brake adtuation, which pedals are arranged approximately perpendicularly relative to each other. However, this conventional vehicle is likewise contemplated for transportating a driver in seating posture, and the acceleration pedal protruding vertically from the tread board is difficult to operate by a standing user. Now, it is the object of the present invention to provide an electric vehicle for a standing user, with which handling and transportation of such vehicle should be simplified. The vehicle should lend itself to be safely used even by unskilled users and particularly also by disabled persons.

In an electric vehicle of the type as outlined at the beginning, according to the invention this object is solved in that the control element is formed by a portion of said tread board being designed as a rocking pedal for controlling said electric motor by depression of the front portion of said pedal, and for actuating the the brakes by depression of the rear pedal portion.

In order to render easy the use of the vehicle especially for disabled persons, the rocking pedal is preferably slidable on a transverse rod transversely to the longitudinal axis of the vehicle. Accordingly, the user may move the rocking pedal to the left or right hand side of the tread board, as required.

Still further, handling of the vehicle is facilitated in advantageous manner by an electronic control system for continuously regulating the speed of travel, and being adapted to be activated by means of the rocking pedal. Voltage losses caused by the control system may be avoided by means of a switch disposed in the vicinity of the rocking pedal, which switch in the front terminal position of the rocking pedal closes (completes) a direct circuit between the battery and the electric motor. In this way, the full battery voltage is available at maximum travelling speed. An electronic control system including a switch for direct power supply is known, as a bicycle drive system, from "VDI-Zeitung" 117 (1975), No. 22, pages 1051 to 1055.

Expediently, the electric vehicle includes a pair of brakes adapted to be operated by the rocking pedal and engaging the rear wheels under spring bias. By means of such spring bias, it is ensured in a manner being known per se (U.S. Pat. No. 3,117,648) that the vehicle is positively stopped when the rocking pedal is unloaded.

Transportation of the vehicle is facilitated when the handle bar is removable; although this feature is conventional, too, the handle bar can be removed in particularly easy manner because, according to the invention, no control elements are mounted on the handle bar.

Figure 2:
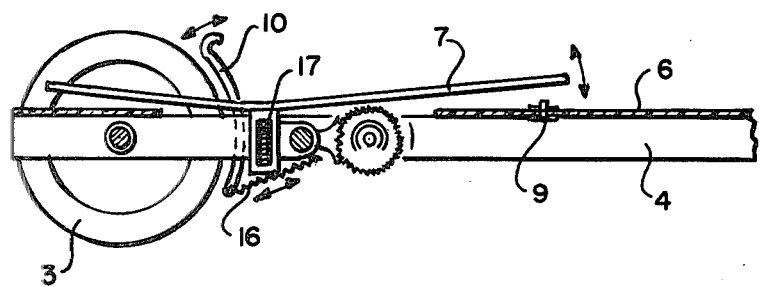

Below, a preferred embodiment of the present invention is explained in greater detail by referring to the accompanying drawing, wherein:

FIG. 1 is a perspective view of an electric vehicle according to the invention; and FIG. 2 shows in detail the rocking pedal for controlling the motor and actuating the brakes.

The electric vehicle comprises essentially a chassis 4 suspending a pair of rear wheels 3 and a steerable front wheel 2 driven by an electric motor. The fairing (body) 5 of the vehicle is designed so as to define between the rear wheels 3 a tread board 6 for the user. Part of this tread board 6 is formed as a rocking pedal 7 for controlling the electric motor and actuating the brakes 10.

In a recess in the body 5, a battery support 13 in combination with a battery is placed.

By depressing the front portion of the rocking pedal 7, the travelling speed of the vehicle may be controlled continuously through a not illustrated electronic control system. In the terminal position of the rocking pedal 7, the latter activates a switch 9 acting to close a direct circuit between the battery and the electric motor. Depression of the rear portion of the rocking pedal results in actuation of the brakes 10 positioned below wheel ducts 15. In the horizontal position of the rocking pedal 7, the brakes 10 are biased by springs 16 such that the vehicle is prevented from rolling away when it is not in use. The rocking pedal 7 is mounted to a transverse or cross rod 17 on which the pedal may be moved to the right or to the left, as desired by the user.

The handle bar 12 an be easily removed for transportation after loosening a screw or nut 20.

What is claimed is:

1. An electric vehicle comprising:

an electric motor;

a chassis having a pair of rear wheels, a steerable front wheel driven by said motor, a tread board disposed between the wheels, configured to be stood upon by a standing user or driver and means mounting a portion of said tread board to form a rocking pedal; and a vehicle control means including a speed control element connected to said motor to control the speed thereof;

said speed control element comprising a front portion of said pedal and an electronic control system connected to said motor said electronic control system being operable, in response to the depression of said front portion of said pedal, to control said electric motor; and said speed control element further comprising a pair of brakes actuatable by said rocking pedal to engage said rear wheels under spring bias in response to the depression of a rear portion of said pedal.

2. The electric vehicle according to claim 1, wherein the mounting means comprises a rod disposed transversely of the longitudinal direction of said vehicle and around which the pedal rocks.

3. The electric vehicle according to claim 1, wherein the vehicle control means further includes a battery and a switch in the vicinity of said rocking pedal for connecting a circuit between the battery and said electric motor.

4. The electric vehicle according to claim 1, further comprising a handle bar removably connected to the chassis for steering the front wheel.

* * * * *